United States Patent
Kasada

(10) Patent No.: US 10,026,433 B2
(45) Date of Patent: *Jul. 17, 2018

(54) MAGNETIC TAPE HAVING CONTROLLED SURFACE PROPERTIES OF THE MAGNETIC LAYER AND METHOD OF MANUFACTURING THE SAME

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,286

(22) Filed: Aug. 19, 2016

(65) Prior Publication Data

US 2017/0053669 A1    Feb. 23, 2017

(30) Foreign Application Priority Data

Aug. 21, 2015  (JP) .................................. 2015-164165
Aug. 18, 2016  (JP) .................................. 2016-160392

(51) Int. Cl.
   *G11B 5/70*     (2006.01)
   *G11B 5/78*     (2006.01)
   *G11B 5/708*    (2006.01)
   *G11B 5/842*    (2006.01)

(52) U.S. Cl.
   CPC ................. *G11B 5/78* (2013.01); *G11B 5/70* (2013.01); *G11B 5/7085* (2013.01); *G11B 5/842* (2013.01)

(58) Field of Classification Search
   None
   See application file for complete search history.

(56) References Cited

U.S. PATENT DOCUMENTS

| 4,825,317 A * | 4/1989 | Rausch ................... G11B 15/58 360/128 |
| 8,535,817 B2 * | 9/2013 | Imaoka .................... G11B 5/70 428/844 |
| 2011/0052908 A1 | 3/2011 | Imaoka |
| 2017/0053670 A1 * | 2/2017 | Oyanagi .................. G11B 5/70 |

(Continued)

FOREIGN PATENT DOCUMENTS

| JP | 63-249932 A | 10/1988 |
| JP | 64-60819 A | 3/1989 |

(Continued)

OTHER PUBLICATIONS

Derwent Abstract of JP 2002-367318 A (Year: 2002).*

(Continued)

*Primary Examiner* — Kevin M Bernatz
(74) *Attorney, Agent, or Firm* — Sughrue Mion, PLLC

(57) ABSTRACT

The magnetic tape has a nonmagnetic layer containing nonmagnetic powder and binder on a nonmagnetic support, and has a magnetic layer containing ferromagnetic powder and binder on the nonmagnetic layer, wherein the combined thickness of the magnetic layer and the nonmagnetic layer is less than or equal to 0.80 μm; and the logarithmic decrement as determined by a pendulum viscoelasticity test on the surface on the magnetic layer side of the magnetic tape is less than or equal to 0.050 and the coefficient of friction as measured on a base portion of the surface on the magnetic layer side is less than or equal to 0.35.

17 Claims, 4 Drawing Sheets

(56) References Cited

U.S. PATENT DOCUMENTS

2017/0053671 A1* 2/2017 Kasada .................... G11B 5/78
2017/0178675 A1* 6/2017 Kasada .................... G11B 5/68
2017/0372727 A1* 12/2017 Kasada ............. G11B 5/00813
2017/0372737 A1* 12/2017 Oyanagi ............ G11B 5/00813
2018/0061447 A1* 3/2018 Kasada .................... G11B 5/78

FOREIGN PATENT DOCUMENTS

JP       2002367318 A  * 12/2002
JP       2010-49731 A     3/2010
JP       2011-48878 A     3/2011

OTHER PUBLICATIONS

Office Action dated Oct. 5, 2017 from the United States Patent and Trademark Office in copending U.S. Appl. No. 15/378,907.
Office Action dated Oct. 5, 2017 from the United States Patent and Trademark Office in copending U.S. Appl. No. 15/241,297.
Office Action dated Oct. 5, 2017 from the United States Patent and Trademark Office in copending U.S. Appl. No. 15/241,631.

* cited by examiner

MAGNETIC TAPE HAVING CONTROLLED SURFACE PROPERTIES OF THE MAGNETIC LAYER AND METHOD OF MANUFACTURING THE SAME

CROSS-REFERENCE TO RELATED APPLICATIONS

This application claims priority under 35 U.S.C 119 to Japanese Patent Application No. 2015-164165 filed on Aug. 21, 2015 and Japanese Patent Application No. 2016-160392 filed on Aug. 18, 2016. Each of the above applications is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data backup.

A magnetic tape is housed wound up on a reel within a magnetic tape cartridge. To increase the recording capacity per magnetic tape cartridge, it is better to increase the overall length of the magnetic tape that is housed per cartridge. To that end, it is desirable to reduce the thickness (also referred to as "thickness reduction" hereinafter) of the magnetic tape. One example of a way to reduce the thickness of a magnetic tape is to reduce the thickness of one or more layers contained in the magnetic tape. In this regard, rendering the magnetic layer less than or equal to 0.1 μm in thickness is described in Japanese Unexamined Patent Publication (KOKAI) No. 2011-48878 (see claim 1 of Japanese Unexamined Patent Publication (KOKAI) No. 2011-48878). The contents of the above publication as well as English language family members US2011/052908A1 and U.S. Pat. No. 8,535,817 are expressly incorporated herein by reference in their entirety.

SUMMARY OF THE INVENTION

One way to reduce the thickness of a magnetic tape is to reduce the combined thickness of the magnetic layer and the nonmagnetic layer in a magnetic tape sequentially comprising a nonmagnetic layer and a magnetic layer on a nonmagnetic support. For example, in Examples in Japanese Unexamined Patent Publication (KOKAI) No. 2011-48878, a magnetic layer is provided over a nonmagnetic layer (see Japanese Unexamined Patent Publication (KOKAI) No. 2011-48878, paragraph 0073) 1.0 μm in thickness. Due to the ever higher recording capacities being demanded in recent years, reducing the thickness of the nonmagnetic layer and/or magnetic layer is desirable to farther reduce the combined thickness of the magnetic layer and nonmagnetic layer.

The present inventor examined to reduce the combined thickness of the magnetic layer and nonmagnetic layer in a magnetic tape sequentially comprising a nonmagnetic layer and a magnetic layer on a nonmagnetic support. He found that particularly in a magnetic tape in which the combined thickness of the magnetic layer and nonmagnetic layer were reduced to less than or equal to 0.80 μm, the frequency of occurrence of a phenomenon (referred to hereinafter as a "partial output drop") whereby a partial drop in the reproduction signal amplitude occurred increased in the course of reproducing a signal recorded on the tape. The greater the frequency of occurrence of the partial output drop became, the higher the error rate and the greater the drop in reliability of the magnetic tape ended up being. Thus, there is a need to reduce this frequency of occurrence.

An aspect of the present invention provides for a magnetic tape in which the occurrence of partial output drops during signal reproduction is inhibited in the form of a magnetic tape in which the combined thickness of the magnetic layer and nonmagnetic layer is less than or equal to 0.80 μm.

An aspect of the present invention relates to a magnetic tape having a nonmagnetic layer containing nonmagnetic powder and binder on a nonmagnetic support, and having a magnetic layer containing ferromagnetic powder and binder on the nonmagnetic layer, wherein:

the combined thickness of the magnetic layer and the nonmagnetic layer is less than or equal to 0.80 μm; and the logarithmic decrement as determined by a pendulum viscoelasticity test on the surface on the magnetic layer side of the magnetic tape is less than or equal to 0.050 and the coefficient of friction as measured on a base portion of the surface on the magnetic layer side is less than or equal to 0.35.

Although the combined thickness of the magnetic layer and nonmagnetic layer in the above magnetic tape is reduced to less than or equal to 0.80 μm, it is possible to inhibit the occurrence of partial output drops. The presumptions of the present inventor in this regard will be given further below.

In one embodiment, the logarithmic decrement is greater than or equal to 0.010 but less than or equal to 0.050.

In one embodiment, the ferromagnetic powder is selected from the group consisting of ferromagnetic hexagonal ferrite powder and ferromagnetic metal powder. The term "ferromagnetic powder" means an aggregation of multiple ferromagnetic particles. The term "aggregation" is not limited to forms in which the constituent particles are in direct contact, but includes forms in which binder, additives, or the like are present between the particles. The term "particles" is also sometimes used to denote powder. These points are also applied to the various powders in the present invention and present specification.

In one embodiment, the magnetic layer further contains nonmagnetic powder.

In one embodiment, the nonmagnetic powder that is contained in the magnetic layer contains two or more kinds of nonmagnetic powder with differing Mohs hardness.

In one embodiment, the nonmagnetic powder contained in the magnetic layer contains inorganic powder with Mohs hardness of higher than 8.

In one embodiment, the nonmagnetic powder contained in the magnetic layer contains nonmagnetic colloidal particles. In the present invention and present specification, the term "colloidal particles" means particles capable of forming a colloidal dispersion without precipitating when added in a quantity of 1 g per 100 mL of at least one organic solvent from among methyl ethyl ketone, cyclohexanone, toluene, or ethyl acetate, or a mixed solvent of two or more of these solvents in any mixing ratio.

A further aspect of the present invention relates to a method of manufacturing the above magnetic tape, including forming of a nonmagnetic layer and forming of a magnetic layer, wherein the forming of a magnetic layer includes:

coating a magnetic layer-forming composition containing ferromagnetic powder, binder, a curing agent, and solvent on a nonmagnetic layer to form a coating layer, heating and drying the coating layer by a heat treatment, and curing the coating layer by subjecting the coating layer to a curing treatment;

with cooling the coating layer after the coating but before the heating and drying, and burnishing the surface of the coating layer after the heating and drying but before the curing.

In one embodiment, the cooling is conducted by placing the coating layer in a cooling environment of −10° C. to 0° C.

In one embodiment, the solvent that is contained in the magnetic layer-forming composition contains ketone solvent.

In one embodiment, the curing agent is a thermosetting compound and the curing is conducted by a heat treatment.

In one embodiment, the thermosetting compound is polyisocyanate.

In one embodiment, a surface-smoothing is conducted between the burnishing and the curing.

An aspect of the present invention can provide a magnetic tape in which the combined thickness of the magnetic layer and nonmagnetic layer is less than or equal to 0.80 µm and the occurrence of partial output drops during signal reproduction is inhibited.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
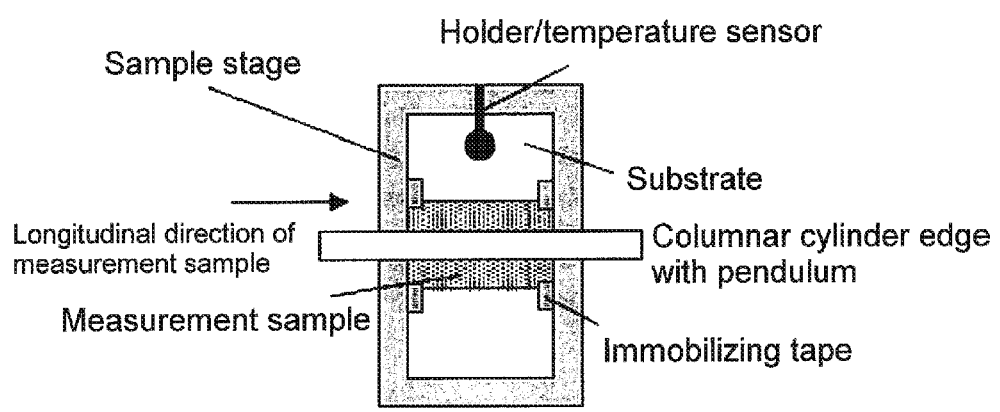
FIG. 1 is a descriptive drawing of the method of measuring the logarithmic decrement.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to a magnetic tape having on a nonmagnetic support a nonmagnetic layer containing nonmagnetic powder and binder, and having a magnetic layer containing ferromagnetic powder and binder on the nonmagnetic layer, with the combined thickness of the magnetic layer and the nonmagnetic layer being less than or equal to 0.80 µm, the logarithmic decrement as determined by a pendulum viscoelasticity test on the surface of the magnetic layer side of the magnetic tape (also referred to hereinafter simply as the "logarithmic decrement") being less than or equal to 0.050, and the coefficient of friction as measured on a base portion of the surface on the magnetic layer side (also referred to hereinafter as the "base portion friction") being less than or equal to 0.35.

The "base portion" as referred to in the present invention and the present specification is the portion of the surface on the magnetic layer side of the magnetic tape specified by the following method.

Defining the plane where the volumes of protruding components and indenting components equal out in the field of view as measured by an atomic force microscope (AFM) as the reference plane, protrusions are defined as protrusions greater than or equal to 15 nm in height from the reference plane. The portion where the number of protrusions greater than or equal to 15 nm in height from the reference plane is zero, that is, the portion where no protrusions greater than or equal to 15 nm in height from the reference plane are detected on the surface on the magnetic layer side of the magnetic tape, is specified as the base portion.

The coefficient of friction that is measured on the base portion refers to the value that is measured by the following method.

On the base portion (measurement spot: a 10 µm length in the longitudinal direction of a magnetic tape), a spherical indenter made of diamond that is 1 µm in radius is passed back and forth once at a load of 100 µN and at a speed of 1 µm/s to measure the frictional force (horizontal force) and normal force. The frictional force and normal force that are measured are arithmetic averages obtained by constantly measuring the frictional force and normal force during one back and forth pass. This measurement can be conducted, for example, with a model TI-95 Triboindenter made by Hysitron Corp. The µ value of the coefficient of friction is calculated from the arithmetic average of the frictional force and the arithmetic average of the normal force that are measured. The coefficient of friction is a value that is obtained from the equation: $F=\mu N$ from the frictional force (horizontal force) F (unit: Newtons (N)) and the normal force N (unit: Newtons (N)). The above measurement and calculation of coefficient of friction g value is conducted for three portions of the base portion randomly determined on the surface on the magnetic layer side of the magnetic tape and the arithmetic average of the three measured values obtained is adopted as the coefficient of friction measured on the base portion.

In the present invention and present specification, the term "logarithmic decrement" is a value determined by the following method.

Figure 2:
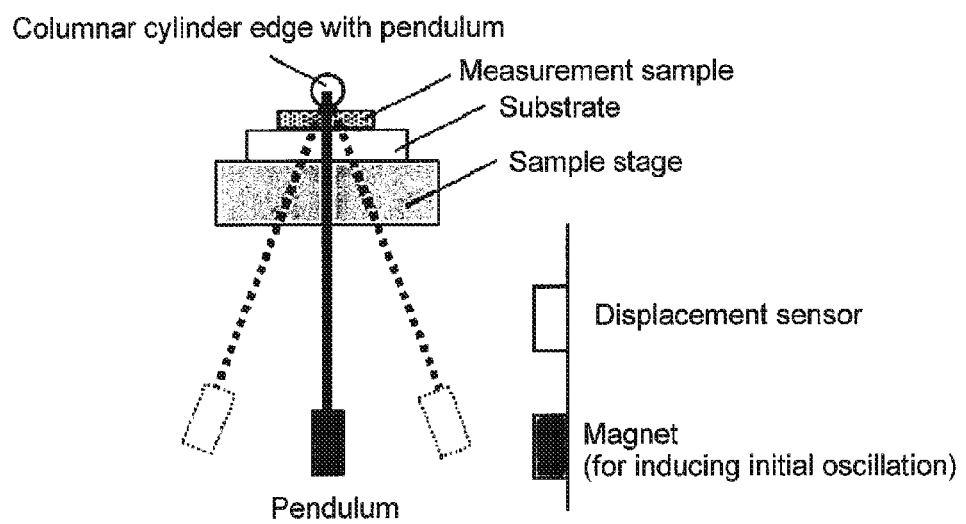
FIG. 2 is a descriptive drawing of the method of measuring the logarithmic decrement.
Figure 3:
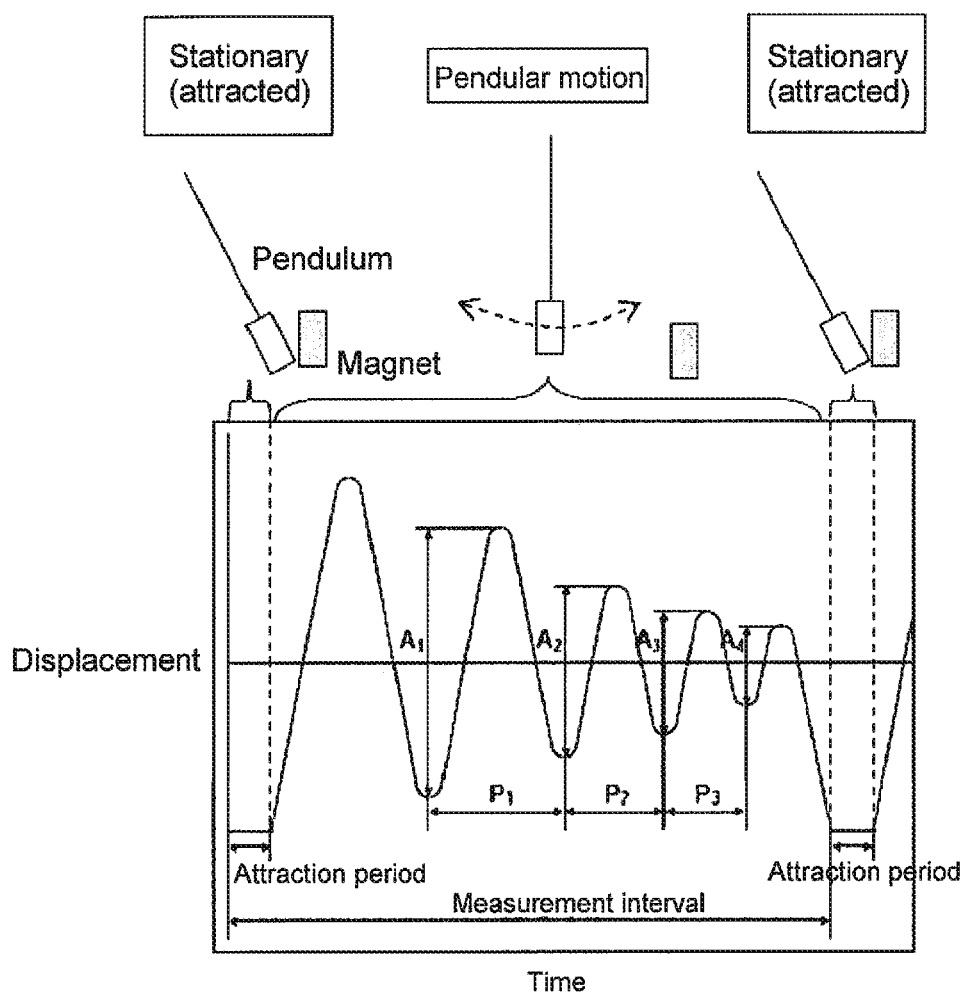
FIG. 3 is a descriptive drawing of the method of measuring the logarithmic decrement.

FIGS. 1 to 3 are descriptive drawings of the method of measuring the logarithmic decrement. The method of measuring the logarithmic decrement will be described below with reference to these figures. However, the forms shown in the figures are examples, and do not limit the present invention in any way.

A measurement sample is cut out of the magnetic tape to be measured. The measurement sample that has been cut out is placed with the measurement surface (surface on the magnetic layer side) facing upward on a substrate in a pendulum viscoelasticity tester, and is secured with immobilizing tape or the like in a state with no visibly apparent wrinkles. The columnar cylinder edge (4 mm in diameter) equipped with a pendulum 13 g in weight is disposed on the measurement surface of the measurement sample such that the long axis direction of the columnar cylinder edge runs parallel to the longitudinal direction of the measurement sample. An example of the columnar cylinder edge equipped with a pendulum positioned (as viewed from above) on the measurement surface of a measurement sample in this manner is shown in FIG. 1. In the form shown in FIG. 1, a holder/temperature sensor is positioned in a configuration permitting monitoring of the substrate surface temperature. However, this configuration is not essential. The longitudinal direction of the measurement sample refers to the longitudinal direction of the magnetic tape out of which the measurement sample has been cut. The angles such as "parallel" that are referred to in the present specification may include the range of error that is permitted in the technical field to which the present invention belongs. For example, they mean falling within a range of less than ±10° of the precise angle. The error relative to the precise angle is desirably less than or equal to 5°, preferably less than or equal to 3°. The pendulum employed is made of a material having the property of being drawn by a magnet, such as a metal, alloy, or the like.

The surface temperature of the substrate on which the measurement sample has been positioned is raised at a rate of less than or equal to 5° C./min (any rate of increase less than or equal to 5° C./min will do) up to 80° C., and movement of the pendulum is begun (initial oscillation is induced) by removing the attraction between pendulum and magnet. FIG. 2 shows an example of how the pendulum moves (a lateral view). In the form shown in FIG. 2, within the pendulum viscoelasticity tester, the passage of electricity to the magnetic (electromagnet) positioned beneath the sample stage is halted (the switch is turned off) to remove the attraction, thereby causing the pendulum to begin to move. When electricity is restored to the electromagnetic (the switch is turned on), the pendulum is drawn by the magnetic, stopping movement of the pendulum. During movement of the pendulum, as shown in FIG. 2, the pendulum oscillates repeatedly. While the pendulum is oscillating repeatedly, the displacement of the pendulum is monitored by a displacement sensor. Based on the results obtained, a displacement-time curve is obtained by plotting the displacement on the Y-axis and time on the X-axis. FIG. 3 shows an example of a displacement-time curve. The correlation between the status of the pendulum and the displacement-time curve is schematically shown in FIG. 3. During a given measurement interval, stationary (attraction) and pendular motion are repeated. Using a displacement-time curve obtained for a measurement interval of greater than or equal to 10 minutes (any period greater than or equal to 10 minutes will do), the logarithmic decrement Δ (no unit) is obtained from the equation given below. The value obtained is adopted as the logarithmic decrement of the surface on the magnetic layer side of the magnetic tape. One attraction period is made greater than or equal to 1 second (any period greater than or equal to 1 second will do), and the period from the end of one attraction to the start of the next attraction is made greater than or equal to 6 seconds (any period greater than or equal to 6 seconds will do). The measurement interval refers to the interval from the start of one attraction to the start of the next attraction. The humidity of the environment in which pendular motion is conducted can be any relative humidity falling within a range of 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, the interval from one minimum displacement to the next minimum displacement is adopted as one wave period. The number of waves contained in the displacement-time curve during one measurement interval is denoted by n, and the difference between the minimum displacement and the maximum displacement of the $n^{th}$ wave is denoted by An. In FIG. 3, the interval from the minimum displacement of the $n^{th}$ wave to the next minimum is denoted as Pn (for example, $P_1$ for the 1st wave, $P_2$ for the second, $P_3$ for the third). The logarithmic decrement is calculated using the difference between the next minimum displacement and maximum displacement of the $n^{th}$ wave ($A_{n+1}$ in the above equation, $A_4$ in the displacement-time curve shown in FIG. 3). However, the portion during which the pendulum is stationary (attracted) following the maximum is not employed in counting the number of waves. Nor is the portion during which the pendulum is stationary (attracted) before the maximum displacement used to count the number of waves. Accordingly, in the displacement-time curve shown in FIG. 3, the number of waves is 3 (n=3).

Although not intended to limit the present invention in any way, the reasons for which the present inventor presumes that the occurrence of partial output drops during signal reproduction can be inhibited despite reducing the combined thickness of the magnetic layer and nonmagnetic layer to less than or equal to 0.80 µm in the magnetic tape are as follows.

(1) To record or reproduce a signal on a magnetic tape, the magnetic tape cartridge housing the magnetic tape is placed in a drive and the surface on the magnetic layer side of the magnetic tape is brought into contact with (slid against) a magnetic head (also referred to simply as a "head" hereinafter). However, in a magnetic tape in which the combined thickness of the magnetic layer and the nonmagnetic layer exceeds 0.80 µm, the portion where the head comes into contact with the surface on the magnetic layer side (actual contact portion) is thought to consist primarily of the protrusions described above with regard to the base portion, and the base portion either does not come into contact, or the frequency of contact is low. In conducting extensive research in this regard, the present inventor found that in a magnetic tape in which the combined thickness of the magnetic layer and nonmagnetic layer had been reduced to less than or equal to 0.80 μm, reducing this combined thickness reduced the strength and produced flexibility, causing the present inventor to presume that increased frequency of contact between the base portion of the surface on the magnetic layer side and the head was one reason for partial output drops. Conventionally, as regards the surface properties of the surface on the magnetic layer side of a magnetic tape, adjusting the height and the like of the protrusions has been examined (for example, the above Japanese Unexamined Patent Publication (KOKAI) No. 2011-48878), but the base portion has not been taken into account. By contrast, the present inventor focused on the base portion that has conventionally not been taken into account. He presumes that reducing the friction coefficient of the base portion to less than or equal to 0.35 can contribute to inhibiting the occurrence of partial output drops during signal reproduction in a magnetic tape in which the combined thickness of the nonmagnetic layer and magnetic layer is less than or equal to 0.80 μm.

(2) In a magnetic tape in which the combined thickness of the magnetic layer and the nonmagnetic layer has been reduced to less than or equal to 0.80 μm, the base portion—which is thought either not to come into contact with the head or have a low frequency of contact in a magnetic tape in which the combined thickness of the magnetic layer and nonmagnetic layer exceeds 0.80 μm—has a tendency to come into contact with the head, so the area of contact between the magnetic head and surface of the magnetic layer (actual contact area) is thought to increase. As a result, the present inventor presumes that components derived from the magnetic tape tend to pass from the surface of the magnetic head and adhere to the head, constituting one reason for partial output drops.

Accordingly, the present inventor conducted further extensive research into reducing the quantity of components derived from the magnetic tape that adhere to the head. As a result, he conceived of the idea that the logarithmic decrement could serve as an indicator of the quantity of component adhering to the head, and that keeping that value to less than or equal to 0.050 would contribute to inhibiting the occurrence of partial output drops.

By keeping the base portion friction to less than or equal to 0.35 and the logarithmic decrement to less than or equal to 0.050 in this manner, it is possible to inhibit the occurrence of partial output drops in a magnetic tape in which the combined thickness of the magnetic layer and the nonmagnetic layer is reduced to less than or equal to 0.80 μm.

The present inventor presumes that the compounds derived from the magnetic tape set forth above adhere to the head in the form of adhesive components released from the magnetic tape while running. Although the details of such adhesive components have yet to be elucidated, the present inventor presumes that they are derived from resin that is employed as binder. The details are as follows. As will be set forth in greater detail further below, various resins can be employed. The term "resin" refers to polymer of two or more polymerizable compounds (including homopolymer and copolymer), with compounds the molecular weight of which falls below the average molecular weight (referred to as "low-molecular-weight binder components" hereinafter) normally also being contained. The present inventor presumes that the release of such low-molecular-weight binder components from the magnetic tape and their adhesion to the head causes partial output drops. Such low-molecular-weight binder components are also thought to have adhesive properties. The present inventor presumes that the logarithmic decrement as determined by a pendulum viscoelasticity test can be an indicator of the quantity of such components that adhere to the head during running. In one embodiment, a magnetic layer-forming composition containing a curing agent in addition to ferromagnetic powder and binder is coated over a nonmagnetic layer and a curing treatment is conducted to form the magnetic layer. The curing treatment causes the binder and curing agent to undergo a curing reaction (crosslinking reaction). The present inventor presumes that, although the reasons are unclear, the low-molecular-weight binder components exhibit poor reactivity in the curing reaction. Thus, the present inventor presumes that the low-molecular-weight binder components tend not to remain in the magnetic layer, are released from the magnetic layer, and tend to adhere to the head, which is one reason low-molecular-weight binder components tend to adhere to the head during running.

However, the above is merely presumed by the present inventor, and is not intended to limit the present invention in any way.

The magnetic tape will be described in greater detail below.

[Magnetic Layer]

<Logarithmic Decrement>

The logarithmic decrement that is determined by a pendulum viscoelasticity test on the surface of the magnetic tape on the magnetic layer side is less than or equal to 0.050. From the perspective of inhibiting the occurrence of partial output drops to a greater degree, the logarithmic decrement is desirably less than or equal to 0.048, preferably less than or equal to 0.045, and more preferably, less than or equal to 0.040. From the perspective of inhibiting the occurrence of partial output drops, the lower the logarithmic decrement the better, so no lower limit has been specifically established. By way of example, the logarithmic decrement can be greater than or equal to 0.010, or greater than or equal to 0.015, or can fall below these values. Specific ways of adjusting the logarithmic decrement will be described further below.

<Base Portion Friction>

The coefficient of friction (base portion friction) that is measured for the base portion of the surface on the magnetic layer side of the above magnetic tape is less than or equal to 0.35. The coefficient of friction of the base portion is measured by the method set forth above. From the perspective of inhibiting to a greater degree the occurrence of partial output drops, the base portion friction is desirably less than or equal to 0.30. By way of example, the base portion friction is greater than or equal to 1.00. From the perspective of inhibiting the occurrence of partial output drops during signal reproduction, the lower it is the better. Thus, no specific lower limit has been established.

The present inventor assumes that irregularities that are more microscopic than the protrusions that are formed on the surface on the magnetic layer side, for example, by nonmagnetic powder described further below are present on the base portion. The present inventor presumes that the base portion friction can be adjusted by controlling the shape of these microscopic irregularities. Based on this presumption, the present inventor formed a magnetic layer using two or more kinds of ferromagnetic powder with different average particle sizes to control the shape of the irregularities of the base portion. As a result, it was possible to control the base portion friction to various values. Accordingly, an example of one way of adjusting the base portion friction is to use two or more kinds of ferromagnetic powder with different average particle sizes as ferromagnetic powder. More specifically, the present inventor assumes that it is possible to form the above microscopic irregularities on the base portion by means of protrusions in the form of ferromagnetic powder of large average particle size, and that it is possible to increase the abundance of protrusions on the base portion by increasing the mixing ratio of ferromagnetic powder of larger average particle size (and conversely, to lower the abundance of protrusions on the base portion by decreasing the mixing ratio). This will be described in greater detail further below.

As another way, the present inventor formed a magnetic layer using additional nonmagnetic powder with an average particle size greater than that of the ferromagnetic powder together with the nonmagnetic powder capable of forming protrusions by protruding from the surface of the magnetic layer to control the shape of irregularities on the base portion. They were thus able to control the base portion friction to various values. Accordingly, another example of a way of adjusting the base portion friction is to use this additional nonmagnetic powder when forming the magnetic layer. More specifically, the present inventor assumes that the additional nonmagnetic powder becomes protrusions that form the above microscopic irregularities on the base portion, and that by increasing the mixing ratio of such nonmagnetic powder, it is possible to increase the abundance of protrusions on the base portion (and conversely, to lower the abundance of protrusions on the base portion by decreasing the mixing ratio). This will be described in greater detail further below.

Additionally, it is possible to adjust the base portion friction by combining the above two methods.

However, the above adjustment methods are examples. Any means of adjustment can be used to achieve a base portion friction of less than or equal to 0.35, and such embodiments are included in the present invention.

<Ferromagnetic Powder>

As set forth above, one way to adjust the base portion friction is control with the ferromagnetic powder. The various powders that are commonly employed as ferromagnetic powders in the magnetic layers of magnetic tapes can be employed as the ferromagnetic powder contained in the magnetic layer of the above magnetic tape.

For example, from the perspective of enhancing the recording density of the magnetic tape, it is desirable to employ a ferromagnetic powder with a small average particle size as the ferromagnetic powder employed in the greatest proportion in the magnetic layer. From this perspective, when employing ferromagnetic powders in the magnetic layer in the form of two or more kinds of ferromagnetic powder of differing average particle size, it is desirable to employ ferromagnetic powder with an average particle size of less than or equal to 50 nm as the ferromagnetic powder employed in the greatest proportion. From the perspective of stable magnetization, the average particle size of the ferromagnetic powder employed in the greatest proportion is desirably greater than or equal to 10 nm. When not employing two or more kinds of ferromagnetic powder of differing average particle size, but rather one ferromagnetic powder, the average particle size of the ferromagnetic powder employed is desirably less than or equal to 50 nm, and desirably less than or equal to 10 nm, for the above reasons.

By contrast, the ferromagnetic powder that is employed along with the ferromagnetic powder employed in the greatest proportion desirably has an average particle size that is greater than that of the ferromagnetic powder that is employed in the greatest proportion. That is because it is assumed that protrusions formed on the base portion by ferromagnetic powder of large average particle size can reduce the base portion friction. From this perspective, the difference between the average particle size of the ferromagnetic powder employed in the greatest proportion and the average particle size of the ferromagnetic powder employed with it, denoted as the "(average particle size of the latter)−(average particle size of the former)", desirably falls within a range of 10 to 80 nm, preferably falls within a range of 10 to 50 nm, more preferably falls within a range of 10 to 40 nm, and still more preferably, falls within a range of 12 to 35 nm. It is also naturally possible to employ two or more kinds of ferromagnetic powder of differing average particle size as the ferromagnetic powder that is employed with the ferromagnetic powder employed in the greatest proportion. In that case, the average particle size of at least one of the two or more kinds of ferromagnetic powder desirably satisfies the above difference with the average particle size of the ferromagnetic powder employed in the greatest proportion. It is desirable for the average particle sizes of more of the ferromagnetic powders to satisfy this difference, and preferably for all of the average particle sizes of the ferromagnetic powders to satisfy this difference.

From the perspective of controlling the base portion friction, it is desirable for the mixing ratio of the ferromagnetic powder employed in the greatest proportion to the additional ferromagnetic powder (when two or more kinds of additional ferromagnetic powder with differing average particle size are employed, the combined total thereof) to fall within a range based on weight of former:latter=90.0:10.0 to 99.9:0.1, preferably within a range of 95.0:5.0 to 99.5:0.5, with regard to two or more kinds of ferromagnetic powder of differing average particle size.

A portion of the above additional ferromagnetic powder can be replaced with nonmagnetic powder, described further below.

The average particle size of the ferromagnetic powder in the present invention is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H1-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder, such as ferromagnetic powder and various kinds of powder, is the average particle size as obtained by the above method unless otherwise stated. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the ferromagnetic powder is ferromagnetic hexagonal ferrite powder. When the ferromagnetic powder employed in the greatest proportion is ferromagnetic hexagonal ferrite powder, the average particle size (average plate diameter), from the perspective of achieving high density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is a specific example of desirable ferromagnetic powder. When the ferromagnetic powder that is employed in the greatest proportion is ferromagnetic metal powder, the average particle size thereof (average major axis length), from the perspective of achieving higher density recording and stable magnetization, is desirably greater than or equal to 10 ram and less than or equal to 50 nm, preferably greater than or equal to 20 nm and less than or equal to 50 nm. Reference can be made, for example, to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powders. The contents of the above publications are expressly incorporated herein by reference in their entirety.

The above magnetic tape can contain ferromagnetic powder in the form of ferromagnetic hexagonal ferrite powder alone, ferromagnetic metal powder alone, or both.

The content (fill rate) of ferromagnetic powder in the magnetic layer desirably falls within a range of 50 to 90 weight percent, preferably within a range of 60 to 90 weight percent. A high fill rate is desirable from the perspective of raising the recording density.

<Binder, Curing Agent>

The above magnetic tape is a particulate magnetic tape. The magnetic layer contains ferromagnetic powder and binder. The various resins that are commonly employed as binders in particulate magnetic recording media can be employed as the binder. Examples of binders are: polyurethane resin, polyester resin, polyamide resin, vinylchloride resin, styrene, copolymerized acrylic resin of acrylonitrile, methyl methacrylate, and the like; nitrocellulose and other cellulose resin; epoxy resin; phenoxy resin; and polyvinyl acetal, polyvinyl butyral, and other polyvinyl alkyral resin. These can be employed singly, or multiple resins can be mixed for use. Of these, polyurethane resin, acrylic resin, cellulose resin, and vinylchloride resin are desirable. These resins can also be employed as binders in the nonmagnetic layer and backcoat layer described further below. Reference can be made to Japanese Unexamined Patent Publication (KOKAI) No. 2010-24113, paragraphs 0028 to 0031, with regard to these resins. The content of the above publication is expressly incorporated herein by reference in its entirety. The average molecular weight of resins that are employed as binders is, by way of example, greater than or equal to 10,000 and less than or equal to 200,000 as a weight average molecular weight. The weight average molecular weight in the present invention and present specification is a value that is obtained by measurement by gel permeation chromatography (GPC) and converted to a polystyrene equivalent. Examples of measurement conditions are given below. The weight average molecular weights given in Examples further below are values obtained by measurement under the following measurement conditions and converted to polystyrene equivalents.

GPC device: HLC-8120 (made by Tosoh Corp.)
Column: TSK gel Multipore HXL-M (7.8 mm inner diameter (ID)×30.0 cm, made by Tosoh Corp.)
Eluent: Tetrahydrofuran (THF)

A curing agent can be employed along with the above resins employed as binders. The curing agent can be a thermosetting compound—a compound in which a curing reaction (crosslinking reaction) progresses when heated—in one embodiment. In another embodiment, the curing agent can be a photo-curable compound—a compound in which a curing reaction (crosslinking reaction) progresses when irradiated with light. Thermosetting compounds are desirable as curing agents; polyisocyanate is suitable. Reference can be made to Japanese Unexamined Patent Publication 2011-216149, paragraphs 0124 and 0125, for details regarding polyisocyanate. In the magnetic layer-forming composition, the curing agent can be employed, for example, in a quantity of 0 to 80.0 weight parts per 100.0 weight parts of binder. From the perspective of enhancing coating strength, a curing agent can be added in a quantity of 50.0 to 80.0 weight parts for use.

<Additives>
(Nonmagnetic Powder)

The above magnetic tape can contain nonmagnetic powder along with ferromagnetic powder and binder in the magnetic layer. The reason for defining the base portion as the portion greater than or equal to 15 nm in height from the reference surface is that the protrusions that are formed by the nonmagnetic powder contained in the magnetic layer and that protrude on the surface of the magnetic layer of the magnetic tape mainly protrude from the reference surface to a height of greater than or equal to 15 nm, and are thought to be present on the surface of the magnetic tape on the magnetic layer side.

The nonmagnetic powder desirably comprises at least one of, and preferably comprises both, nonmagnetic powder that is capable of functioning as abrasive and a protrusion-forming agent that forms protrusions that suitably protrude from the surface of the magnetic layer. Nonmagnetic powder with high Mohs hardness is generally suitable as abrasive. Nonmagnetic powder of Mohs hardness that is lower than nonmagnetic powder capable of functioning as an abrasive is suitable as a protrusion-forming agent. Inorganic powder with Mohs hardness exceeding 8 is desirably employed, and inorganic powder with Mohs hardness of greater than or equal to 9 is preferably employed, as abrasive. The maximum Mohs hardness is the 10 of diamond. Specific examples are alumina ($Al_2O_3$), silicon carbide, boron carbide ($B_4C$), TiC, cerium oxide, zirconium oxide ($ZrO_2$), and diamond powder. Of these, alumina is desirable. The Mohs hardness of alumina is 9. A magnetic layer that contains alumina desirably contains the dispersing agent described in Japanese Unexamined Patent Publication (KOKAI) No. 2013-131285, paragraphs 0012 to 0022, to enhance the dispersion of alumina. Reference can be made to Japanese Unexamined Patent Publication (KOKAI) No. 2013-229090, paragraph 0021. The contents of the above publications are expressly incorporated herein by reference in their entirety. The specific surface area can be employed as an indicator of the size of abrasive particles. The greater the specific surface area, the small the particle size indicated. From the perspective of increasing the smoothness of the surface of the magnetic tape on the magnetic layer side, an abrasive with a specific surface area of greater than or equal to 14 $m^2/g$ is desirably employed. From the perspective of dispersion, it is desirable to employ an abrasive with a specific surface area of less than or equal to 40 $m^2/g$. The term "specific surface area" is a value obtained by the nitrogen adsorption method (also known as the Brunauer-Emmett-Teller (BET) single-point method). This value is measured for primary particles. The specific surface area obtained by this method is also referred to as the BET specific surface area below. The content of abrasive in the magnetic layer is desirably 1.0 to 20.0 weight parts per 100.0 weight parts of ferromagnetic powder.

Nonmagnetic powder with Mohs hardness of less than or equal to 8 is desirable as a nomnagnetic powder that is capable of functioning as a protrusion-forming agent. From the perspective of increasing the surface smoothness of the surface on the magnetic layer side of the magnetic tape, colloidal particles (nonmagnetic colloidal particles) are desirable. The average primary particle size of nonmagnetic colloidal particles is desirably 50 to 200 nm. The average primary particle size of the nonmagnetic colloidal particles in the present invention is a value obtained by the method described in Japanese Unexamined Patent Publication (KOKAI) No. 2011-48878, paragraph 0015. The content of the above publication is expressly incorporated herein by reference in its entirety. Nonmagnetic colloidal particles in the form of inorganic colloidal particles are desirable and those in the form of inorganic oxide colloidal particles are preferred. From the perspective of ready availability of monodisperse colloidal particles, silica colloidal particles (colloidal silica) are particularly desirable. Silica colloidal particles have Mohs hardness of about 5 to 7. Reference can be made to Japanese Unexamined Patent Publication (KOKAI) No. 2011-48878, paragraph 0023, for details on nonmagnetic colloidal particles. The content of nonmagnetic colloidal particles in the magnetic layer is desirably 0.5 to 5.0 weight parts, preferably 1.0 to 3.0 weight parts, per 100.0 weight parts of ferromagnetic powder.

As set forth above, additional nonmagnetic powder can be employed in addition to the above-described nonmagnetic powder to control the base portion friction to less than or equal to 0.35. Such nonmagnetic powder desirably has Mohs hardness of less than or equal to 8. Various kinds of nomnagnetic powder that are commonly employed in the nonmagnetic layer can be employed. The details are as set forth further below for the nonmagnetic layer. An example of preferred nonmagnetic powder is colcothar (red iron oxide). Colcothar has Mohs hardness of about 6.

In the same manner as for the ferromagnetic powder that is employed along with the ferromagnetic powder employed in the greatest proportion as set forth above, an average particle size that is greater than that of the ferromagnetic powder is desirable in the additional nonmagnetic powder. That is because it permits a reduction in the base portion friction by means of protrusions formed on the base portion by the additional nonmagnetic powder. From this perspective, the difference between the average particle size of the ferromagnetic powder and the average particle size of the additional nonmagnetic powder employed with it, obtained as "(average particle size of latter)−(average particle size of former)", desirably falls within a range of 10 to 80 nm, preferably within a range of 10 to 50 nm. When employing two or more kinds of ferromagnetic powder of differing average particle size as the ferromagnetic powder, the ferromagnetic powder that is employed in the greatest proportion is adopted among the two or more kinds of ferromagnetic powder as the ferromagnetic powder that is used to calculate the difference in average particle size with the additional nonmagnetic powder. It is naturally also possible to employ two or more kinds of nonmagnetic powder of differing average particle size as the additional nonmagnetic powder. In that case, it is desirable for the average particle size of at least one of the two or more kinds of nonmagnetic powder to satisfy the above difference, preferable for many of the average particle sizes of the nomnagnetic powders to satisfy this difference, and more preferable for the average particle sizes of all of the additional nonmagnetic powders to satisfy this difference.

From the perspective of controlling the base portion friction, the mixing ratio of the ferromagnetic powder and the above additional nonmagnetic powder (the combined total when employing two or more kinds of additional nonmagnetic powder with differing average particle sizes) based on weight desirably falls within a range of former: latter=90.0:10.0 to 99.9:0.1, preferably within a range of 95.0:5.0 to 99.5:0.5.

As needed, one or more additives can be incorporated into a magnetic layer containing ferromagnetic powder and binder. An example of additives is the above curing agent. At least a portion of the curing agent can be contained into the magnetic layer in a state of having reacted (having crosslinked) with another component such as binder by causing a curing reaction to progress in the magnetic layer-forming process. Examples of additives that can be incorporated into the magnetic layer are lubricants, dispersing agents, dispersion adjuvants, antifungal agents, antistatic agents, oxidation inhibitors, and carbon black. The additives can be used by suitably selecting commercial products based on the properties desired.

The magnetic layer set forth above is provided over a nonmagnetic layer on a nonmagnetic support. Details regarding the nonmagnetic layer and nonmagnetic support will be given further below.

[Nonmagnetic Layer]

The nonmagnetic layer will be described next. In the above magnetic tape, a nonmagnetic layer containing nonmagnetic powder and binder is present between the nonmagnetic support and the magnetic layer. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

Known techniques relating to nonmagnetic layers can be applied to binders, lubricants, dispersing agents, additives, solvents, dispersion methods, and the like of the nonmagnetic layer. Known techniques relating to magnetic layers can be applied as regards the quantity and type of binder and the quantities and types of additives and dispersing agents added.

The nonmagnetic layer in the above magnetic tape may be in the form of an essentially nonmagnetic layer containing small quantities of ferromagnetic powder, either in the form of impurities or by intention, for example, along with nomnagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Various Thicknesses]

In the above magnetic tape, from the perspective of reducing the thickness of the magnetic tape, the combined thickness of the magnetic layer and the nonmagnetic layer is less than or equal to 0.80 µm, desirably less than or equal to 0.70 µm, and more preferably, less than or equal to 0.60 µm. The combined thickness of the magnetic layer and the nonmagnetic layer is, for example, greater than or equal to 0.10 µm, or greater than or equal to 0.20 µm.

As regards the thickness of the nonmagnetic support and various layers in the above magnetic tape, the thickness of the nonmagnetic support is desirably 3.00 µm to 4.50 µm.

The thickness of the magnetic layer can be optimized based on the saturation magnetization level of the magnetic head employed, the head gap length, and the bandwidth of the recording signal. It is generally 0.01 µm to 0.15 µm. From the perspective of achieving higher density recording, it is desirably 0.02 µm to 0.12 µm, preferably 0.03 µm to 0.10 µm. It suffices for the magnetic layer to be comprised of at least one layer. The magnetic layer can be divided into two or more layers having different magnetic characteristics, and known configurations of multilayer magnetic layers can be applied.

The thickness of the nonmagnetic layer is, for example, 0.10 µm to 0.65 µm, desirably 0.10 µm to 0.60 µm, and preferably, 0.10 to 0.50 µm.

The total thickness of the magnetic tape is desirably less than or equal to 6.00 µm from the perspective of enhancing the recording capacity. From the perspective of ease of handling (handling property) of the magnetic tape, the total thickness of the magnetic tape is desirably greater than or equal to 1.00 µm.

The thickness of the various layers and nonmagnetic support of the magnetic tape, as well as the total thickness, can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

[Back Coat Layer]

The above magnetic tape can have a backcoat layer on the opposite surface of the nonmagnetic support from the surface on which the magnetic layer is present. The backcoat layer desirably contains carbon black and inorganic powder. The formulas of the magnetic layer and nonmagnetic layer can be applied to the binder and various additives for forming the backcoat layer. The thickness of the back coat layer is desirably less than or equal to 0.90 µm, preferably 0.10 µm to 0.70 µm.

[Manufacturing Process]

<Preparation of the Various Layer-Forming Compositions>

The compositions for forming the magnetic layer, nonmagnetic layer, and backcoat layer normally contain solvent in addition to the various components that have been set forth above. Examples of the solvent are the various organic solvents generally employed in the manufacturing of particulate magnetic recording media. Specific examples of solvents that can be employed are, in any proportions, acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexanone. Of these, from the perspective of solubility of the binders commonly employed in particulate magnetic recording media, one or more ketone solvents are desirably incorporated into the magnetic layer-forming composition. The quantity of solvent in the magnetic layer-forming composition is not specifically limited. The quantity can be the usual quantity in the magnetic layer-forming composition of a particulate magnetic recording medium.

The description given above also applies to the solvents employed in the various layer-forming compositions, such as the nonmagnetic layer-forming composition and the like.

The process of preparing the compositions for forming the various layers normally includes at least a kneading step, a dispersion step, and mixing steps provided before and after these steps as needed. Each of these steps can be divided into two or more stages. All of the starting materials in the form of ferromagnetic powder, binder, nonmagnetic powder, various optionally added additives, solvent, and the like that are employed in the present invention can be added at the start, or part way through, any of these steps. An individual starting material can be divided for addition in two or more steps. For example, it is possible to separately disperse the abrasive from the ferromagnetic powder in preparing the magnetic layer-forming composition. Separate dispersion is desirable. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter (diameter of beads) and fill rate of these dispersion beads can be optimized for use. A known disperser can be employed.

<Coating Step, Cooling Step, Heating and Drying Step, Burnishing Step, Curing Step>

The magnetic layer can be formed by coating the magnetic layer-forming composition, on a nomnagnetic support, sequentially or simultaneously with the nonmagnetic layer-forming composition. Reference can be made to Japanese Unexamined Patent Publication (KOKAI) No. 2010-231843, paragraph 0066, for details regarding coatings to form the various layers. The content of the above publication is expressly incorporated herein by reference in its entirety.

In one desirable embodiment, the above magnetic tape is manufactured by a manufacturing method including a magnetic layer-forming process, with the magnetic layer-forming process including:

a coating step of forming a coating layer by coating a magnetic layer-forming composition containing ferromagnetic powder, binder, a curing agent, and solvent on a nonmagnetic layer;

a heating and drying step of drying the coating layer by a heat treatment; and a curing step of subjecting the coating layer to a curing treatment;

with a cooling step of cooling the coating layer being incorporated between the coating step and the heating and drying step, and a burnishing step of burnishing the surface of the coating layer being incorporated between the heating and drying step and the curing step.

The present inventor presumes that implementing a cooling step and a burnishing step in the magnetic layer forming process of the above manufacturing method is a desirable way to keep the above-described logarithmic decrement to less than or equal to 0.050. The details are as follows.

The present inventor presumes that conducting a cooling step of cooling the coating layer between the coating step and the heating and drying step can contribute to causing the adhesive components released by the magnetic tape during running to become locally present on the surface and/or in the portion of the outer layer in proximity to the surface of the coating layer. Although the reasons for this are unclear, the present inventor presumes that cooling the coating layer of the magnetic layer-forming composition before the heating and drying step can facilitate migration of adhesive components to the surface and/or outer layer portion of the coating layer during volatilization of the solvent in the heating and drying step. The present inventor presumes that burnishing the surface of the coating layer on the surface of which, and/or in the outer layer portion of which, the adhesive components are locally present can remove the adhesive components. The present inventor presumes that conducting a curing step after having removed the adhesive components in this manner can relate to keeping the logarithmic decrement to less than or equal to 0.050. However, these are merely presumptions, and are not intended to limit the present invention in any way.

That is, an aspect of the present invention relates to a method of manufacturing the above magnetic tape, including a nonmagnetic layer-forming process and a magnetic layer-forming process, with the magnetic layer-forming process including:

a coating step of forming a coating layer by coating a magnetic layer-forming composition containing ferromagnetic powder, binder, a curing agent, and solvent on a nonmagnetic layer;

a heating and drying step of drying the coating layer by a heat treatment; and a curing step of subjecting the coating layer to a curing treatment;

with a cooling step of cooling the coating layer being incorporated between the coating step and the heating and drying step, and a burnishing step of burnishing the surface of the coating layer being incorporated between the heating and drying step and the curing step.

As set forth above, the magnetic layer-forming composition can be multilayer coated sequentially or simultaneously with the nonmagnetic layer-forming composition. In a desirable embodiment, the magnetic tape can be manufactured by sequential multilayer coating. The nonmagnetic layer is formed by coating the nonmagnetic layer-forming composition on a nonmagnetic support to form a coating layer in a coating step, and heating the coating layer that has been formed to dry it in a heating and drying step. The magnetic layer is then formed by coating the magnetic layer-forming composition over the nonmagnetic layer that has been formed to form a coating layer in a coating step, and heating the coating layer that has been formed to dry it in a heating and drying step.

A specific embodiment of the above manufacturing method will be described below based on FIG. 4. However, the present invention is not limited by the specific embodiment set forth below.

Figure 4:
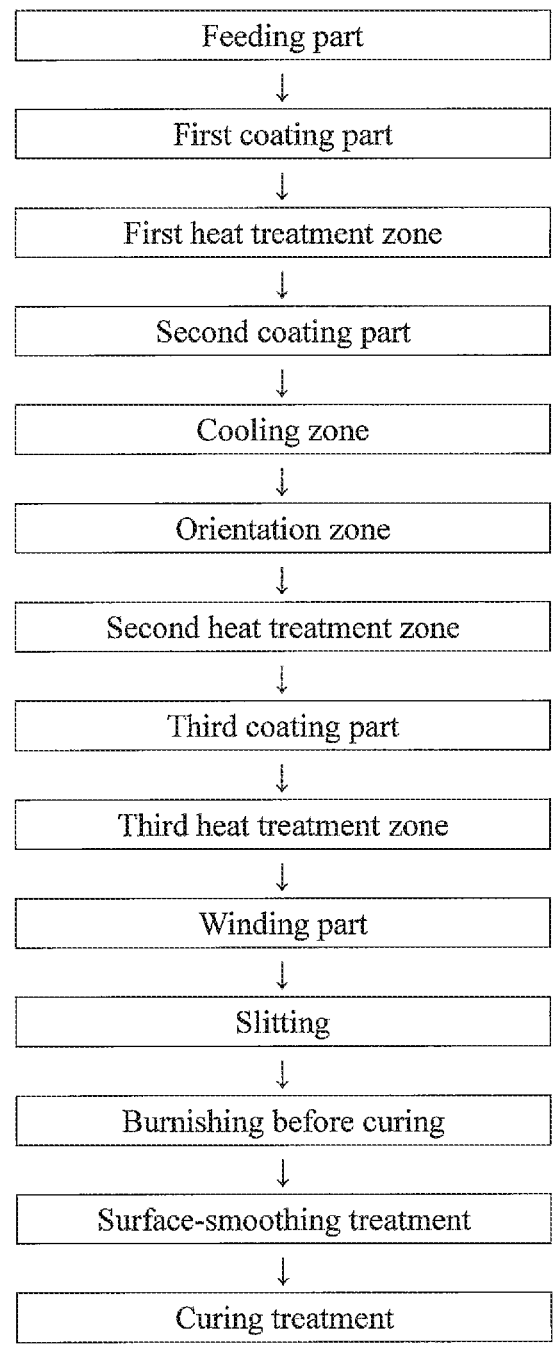
FIG. 4 is an example (process schematic) of a specific form of the magnetic tape manufacturing process.

FIG. 4 is a process schematic showing a specific embodiment of the process of manufacturing a magnetic tape having on one surface of a nonmagnetic support a nonmagnetic layer and a magnetic layer, in that order, and having a backcoat layer on the other surface thereof. In the embodiment shown in FIG. 4, the operations of feeding a nonmagnetic support (elongated film) from a feeding part and winding it up on a winding part are continuously conducted. By means of various processes such as coating, drying, and orienting that are conducted by the various parts and in the various zones shown in FIG. 4, a nonmagnetic layer and magnetic layer are formed by sequential multilayer coating on one surface of a running nomnagnetic support, and a backcoat layer is formed on the other surface thereof. With the exceptions that a cooling zone is incorporated into the magnetic layer-forming process and a burnishing step is incorporated before curing, the process can be conducted in the normal fashion for manufacturing particulate magnetic recording media.

The nonmagnetic layer-forming composition is coated in a first coating part on the nonmagnetic support that is fed by the feeding part (nonmagnetic layer-forming composition coating step).

Following the coating step, the coating layer of the nonmagnetic layer-forming composition that has been formed by the coating step is heated to dry it in a first heating zone (heating and drying step). The heating and drying can be conducted by causing the nonmagnetic support on which is present a coating layer of the nonmagnetic layer-forming composition through a hot atmosphere. The temperature of the hot atmosphere is, for example, 60° C. to 140° C.; a temperature capable of drying the coating layer by volatizing the solvent will suffice, and there is no limitation to within this range. It is also possible to optionally blow a heated gas onto the surface of the coating layer. The above can be applied for the heating and drying step in the second heating zone and the heating and drying step in the third heating zone, described further below.

Next, in the second coating part, the magnetic layer-forming composition is coated on the nonmagnetic layer that has been formed by the heating and drying step in the first heating zone (magnetic layer-forming composition coating step).

Following the above coating step, the coating layer of the magnetic layer-forming composition that has been formed by the coating step is cooled in a cooling zone (cooling step). For example, the cooling step can be conducted by passing the nonmagnetic support, on which the above coating layer has been formed over the nonmagnetic layer, through a cold atmosphere. The temperature of the cold atmosphere desirably falls within a range of −10° C. to 0° C., and preferably falls within a range of −5° C. to 0° C. The duration of the cooling step (for example, the period from when the some portion of the coating layer is conveyed into the cooling zone to when it is conveyed out (also referred to as the "residence time" hereinafter) is not specifically limited. The longer it is, the lower the value of the logarithmic decrement tends to be. It is desirable to respond to the requirement of achieving a logarithmic decrement of less than or equal to 0.050, if necessary, by conducting preliminary tests and making adjustments. It is also possible to blow a cold gas onto the surface of the coating layer in the cooling step.

Subsequently, while the coating layer of the magnetic layer-forming composition is still wet, an orientation treatment is conducted on the ferromagnetic powder in the coating layer in the orientation zone. Reference can be made to Japanese Unexamined Patent Publication (KOKAI) No. 2010-231843, paragraph 0067, with regard to the orientation treatment.

Following the orientation treatment, the coating layer is subjected to a heating and drying step in a second heating zone.

Next, in a third coating part, a coating layer is formed by coating the backcoat layer-forming composition on the surface on the opposite side of the nonmagnetic support from the surface on which the nonmagnetic layer and magnetic layer have been formed (backcoat layer-forming composition coating step). Subsequently, the coating layer is heated and dried in a third heating zone.

In this manner, it is possible to obtain a magnetic tape having a coating layer of a magnetic layer-forming composition that has been heat-dried over a nonmagnetic layer on one surface of a nonmagnetic support, and having a backcoat layer on the other surface thereof. The magnetic tape obtained here will become a finished magnetic tape after being subjected to various processing, described further below.

The magnetic tape that has been obtained is wound on a winding part and then cut (slit) to the size of a finished magnetic tape. A known slitting apparatus can be used to conduct the slitting.

Prior to subjecting the magnetic tape that has been slit to a curing treatment (heating, irradiation with light, or the like) based on the type of curing agent that is contained in the magnetic layer-forming composition, the surface of the coating layer of the magnetic layer-forming composition that has been heated and dried is subjected to burnishing (burnishing step between the heating and drying step and the curing step). The present inventor presumes that this removal by burnishing treatment of the adhesive components that have been made to migrate to the surface and outer layer portion of the coating layer by cooling in the cooling zone can be related to keeping the logarithmic decrement to less than or equal to 0.050. However, as set forth above, this is merely a presumption, and is not intended to limit the present invention in any way.

In the burnishing treatment, the surface that is being treated is rubbed with a material (such as a polishing tape or a grinding apparatus such as a grinding blade or grinding wheel). It can be conducted in the same manner as a burnishing treatment known to be used in manufacturing particulate magnetic recording media. However, no burnishing treatment has conventionally been conducted before the curing step following a cooling step and a heating and drying step. By contrast, conducting a burnishing treatment at this stage can keep the logarithmic decrement to less than or equal to 0.050. This is a new discovery that has been made by the present inventor.

The burnishing treatment is desirably implemented by either rubbing with a polishing tape the surface of the coating layer being treated (polishing), or by grinding with a grinding apparatus the surface of the coating layer being treated (grinding), or by both. When the magnetic layer-forming composition contains an abrasive, it is desirable to employ a polishing tape containing at least one type of abrasive with a higher Mohs hardness than the abrasive. A polishing tape in the form of a commercial product can be employed, or a polishing tape fabricated by a known method can be employed. A grinding apparatus in the form of a known grinding blade, grinding wheel, or the like, such as a fixed blade, diamond wheel, or rotary blade, can be employed. The surface of the coating layer that has been rubbed with a polishing tape or ground with a grinding apparatus can be wiped with a wiping material. Reference can be made to Japanese Unexamined Patent Publication (KOKAI) Heisei No. 6-52544, paragraphs 0034 to 0048, FIG. 1, and Examples given in this publication, for details regarding desirable polishing tapes, grinding apparatus, burnishing treatments, and wiping treatments. The content of the above publication is expressly incorporated herein by reference in its entirety. The more intense the burnishing treatment adopted, the lower the value of the logarithmic decrement tends to be. The higher the degree of hardness of the abrasive contained in the polishing tape, the more the burnishing treatment can be intensified. The greater the quantity of abrasive in the polishing tape, the more the burnishing treatment can be intensified. And the higher the degree of hardness of the grinding apparatus that is employed, the more the burnishing treatment can be intensified. The greater the rate of sliding of the surface of the coating layer being treated against the member (such as a polishing tape or grinding apparatus), the more the burnishing treatment can be intensified. This sliding rate can be increased by increasing either the speed with which the member is displaced or the speed with which the magnetic tape being treated is displaced, or both.

Following the above burnishing treatment (burnishing step), the coating layer of the magnetic layer-forming composition is subjected to a curing treatment. In the embodiment shown in FIG. 4, the coating layer of the magnetic layer-forming composition is subjected to a surface smoothing treatment after the burnishing treatment and before the curing treatment. The surface smoothing treatment is desirably conducted by means of a calendering treatment. For example, reference can be made to Japanese Unexamined Patent Publication (KOKAI) No. 2010-231843, paragraph 0026, for details regarding the calendering treatment.

Subsequently, the coating layer of the magnetic layer-forming composition is subjected to a curing treatment based on the type of curing agent contained in the coating layer (curing step). The curing treatment can be conducted based on the type of curing agent contained in the coating layer, such as in the form of a heat treatment or irradiation with light. The curing treatment conditions are not specifically limited, and can be suitably set based on the formula of the magnetic layer-forming composition employed to form the coating layer, the type of curing agent, the thickness of the coating layer, and the like. For example, when a coating layer has been formed with a magnetic layer-forming composition containing a curing agent in the form of polyisocyanate, the curing treatment is desirably a heat treatment. When a curing agent is contained in a layer other than the magnetic layer, the curing reaction of that layer can be advanced by the curing treatment set forth here. Alternatively, a separate curing step can be provided. It is also possible to conduct another burnishing treatment following the curing step.

It is possible to obtain a magnetic tape having on one surface of a nonmagnetic support a nonmagnetic layer and a magnetic layer in that order, and a backcoat layer on the other surface thereof. The above manufacturing method is suitable for adjusting the logarithmic decrement determined by a pendulum viscoelasticity test on the surface on the magnetic layer side of the magnetic tape to less than or equal to 0.050. However, the manufacturing method set forth above is merely an example. A logarithmic decrement of less than or equal to 0.050 can be achieved by any means permitting adjustment of the logarithmic decrement, and such embodiments are also covered by the present invention.

As set forth above, an example of a way of adjusting the base portion friction is to employ two or more ferromagnetic powders of differing average particle size. More particularly, the magnetic layer can be formed using ferromagnetic powder in the form of first ferromagnetic powder and one or more ferromagnetic powders of larger average particle size than the first ferromagnetic powder.

The following embodiments are examples of desirable embodiments of the above adjusting method. Two or more of the embodiments given below can be combined as a preferred embodiment of the above adjusting method. The "first ferromagnetic powder" refers to one of the ferromagnetic powder among the two or more kinds of ferromagnetic powder employed, and desirably refers to the ferromagnetic powder that is employed in the greatest proportion as set forth above. Other details regarding the above adjusting method are as set forth above.

The average particle size of the first ferromagnetic powder can fall within a range of 10 to 80 nm.

The difference between the average particle size of the ferromagnetic powder with an average particle size greater than that of the first ferromagnetic powder and the average particle size of the first ferromagnetic powder can fall within a range of 10 to 50 nm.

The mixing ratio of the first ferromagnetic powder to the ferromagnetic powder with an average particle size greater than that of the first ferromagnetic powder, by weight, can fall within a range of former:latter=90.0:10.0 to 99.9:0.1.

An example of another way of adjusting the base portion friction is to employ nonmagnetic powder in the magnetic layer in the form of nonmagnetic powder with Mohs hardness exceeding 8, nonmagnetic colloidal particles, and additional nonmagnetic powder.

The following embodiments are examples of desirable embodiments of the above adjusting method. A combination of two or more of the following embodiments is a preferred embodiment of the above adjusting method. Details regarding the above adjusting method are as set forth above.

The average particle size of the additional nonmagnetic powder can be greater than the average particle size of the ferromagnetic powder.

The difference between the average particle size of the ferromagnetic powder and the average particle size of the additional nonmagnetic powder can fall within a range of 10 to 80 nm.

The mixing ratio of the ferromagnetic powder and the additional nonmagnetic powder, based on weight, can fall within a range of former:latter=90.0:10.0 to 99.9:0.1.

However, the above adjusting methods are examples. Any methods of adjusting the base portion friction that is capable of achieving a base portion friction of less than or equal to 0.35 will suffice, and such forms are covered by the present invention.

EXAMPLES

The present invention will be described in greater detail below through Examples. However, the present invention is not limited to the embodiments shown in Examples. The "parts" and "percent (%)" indicated below denote "weight parts" and "weight percent (%)" unless otherwise stated.

Examples 1 to 12, Comparative Examples 1 to 15

1. Preparation of Alumina Dispersion

To 100.0 parts of alumina powder (HIT-70 made by Sumitomo Chemical Co., Ltd.) with an alpha-conversion rate of about 65% and a BET specific surface area of 30 m²/g were admixed 3.0 parts of 2,3-dihydroxynaphthalene (made by Tokyo Chemical Industry Co., Ltd.), 31.3 parts of a 32% solution (mixed solvent of methyl ethyl ketone and toluene) of polyester polyurethane resin (UR-4800 made by Toyobo (Japanese registered trademark) (polar group quantity: 80 meq/kg)) comprising polar groups in the form of SO₃Na groups, and 570.0 parts of a mixed solution of solvents in the form of 1:1 (weight ratio) methyl ethyl ketone and cyclohexanone. The mixture was dispersed for 5 hours in a paint shaker in the presence of zirconia beads. Following dispersion, the dispersion and beads were separated with a mesh, yielding an alumina dispersion.

2. Formula of Magnetic Layer-Forming Composition

| (Magnetic liquid) | |
|---|---|
| Ferromagnetic powder (1) (see Table 1) | see Table 1 |
| Ferromagnetic powder (2) (see Table 1) | see Table 1 |
| SO₃Na group-containing polyurethane resin (weigh average molecular weight: 70,000, SO₃Na groups: 0.2 meq/g) | 14.0 parts |
| Cyclohexanone | 150.0 parts |
| Methyl ethyl ketone | 150.0 parts |
| (Abrasive liquid) | |
| Alumina dispersion prepared in 1. above | 6.0 parts |
| (Silica sol) | |
| Colloidal silica (silica colloidal particles falling within the above definition) Average particle size: 100 nm | 2.0 parts |
| Methyl ethyl ketone | 1.4 parts |
| (Other components) | |
| Stearic acid | 2.0 parts |
| Butyl stearate | 6.0 parts |
| Polyisocyanate (Coronate (Japanese registered trademark) L made by Nippon Polyurethane Industry Co., Ltd.) | 2.5 parts |
| (Finishing solvents) | |
| Cyclohexanone | 200.0 parts |
| Methyl ethyl ketone | 200.0 parts |

3. Formula of Nonmagnetic Layer-Forming Composition

| Nonmagnetic inorganic powder: α-iron oxide Average particle size (average major axis length): 10 nm Average acicular ratio: 1.9 BET specific surface area: 75 m²/g | 100.0 parts |
|---|---|
| Carbon black Average particle size: 20 nm | 20.0 parts |
| SO₃Na group-containing polyurethane resin Weight average molecular weight: 70,000; SO₃Na groups: 0.2 meq/g | 18.0 parts |
| Stearic acid | 1.0 part |
| Cyclohexanone | 300.0 parts |
| Methyl ethyl ketone | 300.0 parts |

4. Formula of Backcoat Layer-Forming Composition

| Nonmagnetic inorganic powder: α-iron oxide Average particle size (average major axis length): 0.15 μm Average acicular ratio: 7 BET specific surface area: 52 m²/g | 80.0 parts |
|---|---|
| Carbon black Average particle size: 20 nm | 20.0 parts |
| Vinyl chloride copolymer | 13.0 parts |
| Sulfonate group-containing polyurethane resin | 6.0 parts |
| Phenylphosphonic acid | 3.0 parts |
| Cyclohexanone | 155.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 200.0 parts |

5. Preparation of Various Layer-Forming Compositions

A magnetic layer-forming composition was prepared by the following method. The above magnetic liquid was prepared by dispersing (bead dispersing) for 24 hours the various components in a batch-type vertical sand mill. Zirconia beads with a bead diameter of 0.5 mmΦ were employed as dispersion beads. The magnetic liquid that had been prepared and the abrasive liquid were mixed with the remaining components (silica sol, other components, and finishing solvents) and bead dispersed for 5 minutes in a sand mill, after which treatment (ultrasonic dispersion) was conducted for 0.5 minute in a batch-type ultrasonic apparatus (20 kHz, 300 W). Subsequently, filtering was conducted with a filter having an average pore diameter of 0.5 μm to prepare a magnetic layer-forming composition.

A nonmagnetic layer-forming composition was prepared by the following method. With the exception of the stearic acid, cyclohexanone, and methyl ethyl ketone, the various components were dispersed for 24 hours in a batch-type vertical sand mill to obtain a dispersion. Zirconia beads with a bead diameter of 0.1 mmΦ were employed as dispersion beads. Subsequently, the remaining components were added to the dispersion that had been obtained and the mixture was stirred in a dissolver. The dispersion thus obtained was filtered with a filter having an average pore diameter of 0.5 μm to prepare a nonmagnetic layer-forming composition.

A backcoat layer-forming composition was prepared by the following method. With the exception of the lubricants (stearic acid and butyl stearate), polyisocyanate, and cyclohexanone, the various components were kneaded and diluted in an open kneader. A horizontal bead mill disperser was then used to conduct 12 passes of dispersion, each pass having a retention time of 2 minutes, in a horizontal bead mill disperser using zirconia beads with a bead diameter of 1 mmΦ at a bead fill rate of 80 volume % and a rotor tip peripheral speed of 10 m/s. Subsequently, the remaining components were added to the dispersion obtained and stirred in a dissolver. The dispersion thus obtained was filtered with a filter having an average pore diameter of 1 μm to prepare a backcoat layer-forming composition.

6. Preparation of Magnetic Tapes

The magnetic tape was prepared in the specific form shown in FIG. 4. The details are as follows.

A polyethylene naphthalate support of the thickness shown in FIG. 1 was fed by a feeding part. The nonmagnetic layer-forming composition prepared in 5. above was coated on one surface thereof in a quantity calculated to yield the thickness upon drying indicated in Table 1 in a first coating part, and drying was conducted in a first heat treatment zone (atmospheric temperature 100° C.) to form a coating layer.

Subsequently, in a second coating part, the magnetic layer-forming composition prepared in 5. above was coated over the nonmagnetic layer in a quantity calculated to yield the thickness shown in Table 1 upon drying to form a coating layer. While the coating layer that had been formed was still wet, a cooling step of passage through a cooling zone adjusted to an atmospheric temperature of 0° C. for the retention time indicated in Table 1 was conducted, and a perpendicular orientation treatment of applying a magnetic field with a field strength of 0.3 T in a perpendicular direction was conducted in an orientation zone. Subsequently, drying (atmospheric temperature 100° C.) was conducted in a second heat treatment zone at an atmospheric temperature of 100° C.

Subsequently, in a third coating part, the backcoat layer-forming composition prepared in 5. above was coated in a quantity calculated to yield the thickness indicated in Table 1 upon drying on the opposite surface of the polyethylene naphthalate support from that on which the nonmagnetic layer and magnetic layer had been formed to form a coating layer. The coating layer that had been formed was then dried in a third heat treatment zone (atmospheric temperature 100° C.).

The magnetic tape thus obtained was slit to a width of ½ inch (0.0127 meter). The surface of the coating layer of the magnetic layer-forming composition was then subjected to a burnishing treatment and wiping treatment. In the burnishing and wiping treatments, polishing tape in the form of commercial polishing tape (product name MA22000 made by Fujifilm, abrasive: diamond/$Cr_2O_3$/red iron oxide), a grinding blade in the form of a commercial sapphire blade (made by Kyocera, 5 mm in width, 35 mm in length, front tip angle 60 degrees), and a wiping material in the form of a commercial wiping material (product name WRP736 made by Kuraray Co., Ltd.) were employed in a processing device configured as described in FIG. 1 of Japanese Unexamined Patent Publication (KOKAI) Heisei No. 6-52544. The processing conditions of Example 12 in Japanese Unexamined Patent Publication (KOKAI) Heisei No. 6-52544 were adopted.

Following the burnishing and wiping treatments, a calendering treatment (surface-smoothing treatment) was conducted at a calender temperature (calender roll surface temperature) of 100° C., a linear pressure of 300 kg/cm, and a speed of 80 m/minute in a calender comprised solely of metal rolls.

Subsequently, a curing treatment (heat treatment) was conducted for 36 hours in an environment with an atmospheric temperature of 70° C. to obtain a magnetic tape.

In the comparative examples in Table 1 for which "0 s" (0 second) is recorded in the cooling zone residence time column, magnetic tapes were fabricated by a manufacturing process that did not incorporate a cooling zone.

In the comparative examples in Table 1 for which "Not implemented" is recorded in the burnishing treatment before curing step column, magnetic tapes were fabricated by a manufacturing process in which no burnishing treatment was conducted in the steps prior to implementing the curing treatment. However, in Comparative Example 15, burnishing and wiping treatments were conducted following the curing treatment.

The magnetic tapes of Examples and Comparative Examples were fabricated by the process set forth above.

The thickness of each of the layers and of the nonmagnetic support, as well as the total thickness of the magnetic tapes fabricated were determined by the following method.

A cross-section in the direction of thickness of the magnetic tape was exposed with an ion beam, after which the exposed cross-section was observed by a scanning electron microscope. The arithmetic average of the thickness as determined at two spots in the direction of thickness by observation of the cross-section was adopted for the various thicknesses.

7. Evaluation Methods
(1) Coefficient of Friction (Base Portion Friction) Measured on the Base Portion of the Surface on the Magnetic Layer Side of the Magnetic Tape Scribe marks were made in advance with a laser marker on the measurement surface and an atomic force microscope (AFM) image was measured in a portion at a certain distance (about 100 µm) from them. This was done at a viewing angle 7 µm square. As set forth further below, to facilitate the pickup up of a scanning electron microscope (SEM) image at the spot, a hard (single crystal silicon) cantilever was installed and scribe marks were made on the AFM. All protrusions with a height of greater than or equal to 15 nm above the reference plane were extracted from the AFM image thus measured. The spot where no protrusions were found was specified as the base portion. The base portion friction was measured by the method described above using a TI-950 Triboindenter made by Hysitron Corp.

A SEM image was measured at the same spot where the AFM had been measured and a component map was obtained. The protrusions greater than or equal to 15 nm in height above the reference plane that were extracted were determined to be protrusions formed of alumina or colloidal silica. In Examples 1 to 12, in the component map by SEM, alumina and colloidal silica were not confirmed on the base portion. Component analysis was performed there by SrEM. However, component analysis is not limited to SEM, and can be conducted by known methods such as energy dispersive X-ray spectrometry (EDS), auger electron spectroscopy (AES), or the like.

The measurement results are given in Table 1.
2. Measurement of Logarithmic Decrement An RPT-3000W rigid-body pendulum-type physical property-testing instrument made by A&D Co., Ltd. (pendulum: made of brass; substrate: glass substrate; rate of substrate temperature increase: 5° C./min) was employed as the measurement device to determine the logarithmic decrements of the surfaces on the magnetic layer sides (magnetic layer surfaces) of the magnetic tapes of Examples and Comparative Examples by the method set forth above. A measurement sample that was cut out of the magnetic tape of each of Examples or Comparative Examples was placed on a glass substrate about 3 cm×about 5 cm in size and secured in four spots with immobilizing tape (Kapton tape, made by Du Pont-Toray Co., Ltd.) as shown in FIG. 1. An attraction time of 1 second and a measurement interval of 7 to 10 seconds were employed, and a displacement-time curve was plotted for the 86th measurement interval. This curve was used to determine the logarithmic decrement. Measurements were conducted in an environment with a relative humidity of about 50%.

(3) Measuring the Frequency of Partial Output Drops in Reproduction

A magnetic tape cartridge housing one of the various magnetic tapes (total length of magnetic tape: 500 m) of Examples and Comparative Examples was placed in a Linear Tape-Open Generation 6 (LTO-G6) made by IBM and the magnetic tape was run back and forth 100 times at a speed of 5 m/s and a tension of 0.6 N.

The reproduction signal was picked up by an external analog/digital (AD) converter during running. A drop of greater than or equal to 60% relative to the average (average measured value for all tracks) of greater than or equal to 1 second in the reproduction signal amplitude was determined to be the occurrence of a partial output drop. The number of times partial output drops occurred while running back and forth 100 times was determined. When the number of partial output drops was 3 or fewer, the magnetic tape was determined to be highly reliable in practical terms.

Table 1 gives the details and the results of the above evaluation for the magnetic-tapes of Examples and Comparative Examples. In Table 1, BF denotes ferromagnetic hexagonal barium ferrite powder. MP denotes ferromagnetic metal powder. The formula ratios of ferromagnetic powders (1) and (2) are given as the content of the various ferromagnetic powders relative to 100.0 weight % of the total quantity of ferromagnetic powder. In Table 1, the average particle size of the ferromagnetic powder is the average major axis length for ferromagnetic metal powder and the average plate diameter for ferromagnetic hexagonal barium ferrite powder. The average particle size of ferromagnetic powder is a value determined by collecting a required quantity from a ferromagnetic powder lot employed to fabricate magnetic tape, and measuring the average particle size by the method set forth above. Following measurement, the ferromagnetic powder was used to prepare the magnetic liquid for fabricating a magnetic tape.

TABLE 1

| | | Ex. 1 | Ex. 2 | Ex. 3 | Ex. 4 | Ex. 5 | Ex. 6 |
|---|---|---|---|---|---|---|---|
| Ferromagnetic powder (1) | Type | BF | BF | BF | BF | BF | MP |
| | Average particle size | 25 nm | 25 nm | 25 nm | 25 nm | 25 nm | 32 nm |
| | Formula ratio | 99.0% | 98.5% | 99.0% | 98.5% | 98.5% | 98.5% |
| Ferromagnetic powder (2) | Kind | BF | BF | BF | BF | BF | MP |
| | Average particle size | 55 nm | 55 nm | 55 nm | 55 nm | 55 nm | 60 nm |
| | Formula ratio | 1.0% | 1.5% | 1.0% | 1.5% | 1.5% | 1.5% |
| Magnetic layer thickness | | 0.10 μm | 0.10 μm | 0.10 μm | 0.10 μm | 0.10 μm | 0.10 μm |
| Nonmagnetic layer thickness | | 0.50 μm | 0.50 μm | 0.50 μm | 0.50 μm | 0.50 μm | 0.50 μm |
| Combined thickness of magnetic layer and nonmagnetic layer | | 0.60 μm | 0.60 μm | 0.60 μm | 0.60 μm | 0.60 μm | 0.60 μm |
| Nonmagnetic support thickness | | 4.30 μm | 4.30 μm | 4.30 μm | 4.30 μm | 4.30 μm | 4.30 μm |
| Backcoat layer thickness | | 0.60 μm | 0.60 μm | 0.60 μm | 0.60 μm | 0.60 μm | 0.60 μm |
| Total thickness of magnetic tape | | 5.50 μm | 5.50 μm | 5.50 μm | 5.50 μm | 5.50 μm | 5.50 μm |
| Cooling zone residence time | | 1 s | 1 s | 60 s | 60 s | 180 s | 60 s |
| Burnishing treatment before curing step | | Implemented | Implemented | Implemented | Implemented | Implemented | Implemented |
| Base portion friction | | 0.28 | 0.23 | 0.28 | 0.23 | 0.23 | 0.24 |
| Logarithmic decrement on the surface on the magnetic layer side of magnetic tape | | 0.046 | 0.046 | 0.035 | 0.035 | 0.015 | 0.035 |
| Number of partial output drops | | 2 times | 2 times | 1 time | 0 time | 0 time | 1 time |

| | | Ex. 7 | Ex. 8 | Ex. 9 | Ex. 10 | Ex. 11 | Ex. 12 |
|---|---|---|---|---|---|---|---|
| Ferromagnetic powder (1) | Type | BF | BF | BF | BF | BF | BF |
| | Average particle size | 25 nm | 25 nm | 25 nm | 25 nm | 35 nm | 25 nm |
| | Formula ratio | 99.0% | 98.5% | 98.5% | 98.5% | 99.2% | 99.0% |
| Ferromagnetic powder (2) | Kind | BF | BF | BF | BF | BF | BF |
| | Average particle size | 55 nm | 55 nm | 55 nm | 55 nm | 55 nm | 55 nm |
| | Formula ratio | 1.0% | 1.5% | 1.5% | 1.5% | 0.8% | 1.0% |
| Magnetic layer thickness | | 0.10 μm | 0.10 μm | 0.10 μm | 0.10 μm | 0.10 μm | 0.05 μm |
| Nonmagnetic layer thickness | | 0.10 μm | 0.10 μm | 0.10 μm | 0.10 μm | 0.50 μm | 0.50 μm |
| Combined thickness of magnetic layer and nonmagnetic layer | | 0.20 μm | 0.20 μm | 0.20 μm | 0.20 μm | 0.60 μm | 0.55 μm |
| Nonmagnetic support thickness | | 4.30 μm | 4.30 μm | 3.60 μm | 3.60 μm | 4.30 μm | 4.30 μm |
| Backcoat layer thickness | | 0.60 μm | 0.60 μm | 0.60 μm | 0.30 μm | 0.60 μm | 0.60 μm |
| Total thickness of magnetic tape | | 5.10 μm | 5.10 μm | 4.40 μm | 4.10 μm | 5.50 μm | 5.50 μm |
| Cooling zone residence time | | 1 s | 60 s | 60 s | 60 s | 1 s | 1 s |
| Burnishing treatment before curing step | | Implemented | Implemented | Implemented | Implemented | Implemented | Implemented |
| Base portion friction | | 0.28 | 0.23 | 0.23 | 0.23 | 0.35 | 0.28 |
| Logarithmic decrement on the surface on the magnetic layer side of magnetic tape | | 0.046 | 0.035 | 0.035 | 0.035 | 0.046 | 0.046 |
| Number of partial output drops | | 2 times | 2 times | 2 times | 2 times | 2 times | 2 times |

TABLE 1-continued

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Ferromagnetic powder (1) | Kind | BF | BF | BF | BF | BF | BF |
| | Average particle size | 25 nm | 25 nm | 25 nm | 25 nm | 25 nm | 25 nm |
| | Formula ratio | 100% | 100% | 100% | 100% | 100% | 100% |
| Ferromagnetic powder (2) | Kind | | | | | | |
| | Average particle size | | | | | | |
| | Formula ratio | | | | | | |
| Magnetic layer thickness | | 0.10 μm | 0.10 μm | 0.10 μm | 0.10 μm | 0.10 μm | 0.10 μm |
| Nonmagnetic layer thickness | | 1.00 μm | 1.00 μm | 1.00 μm | 1.00 μm | 1.00 μm | 0.80 μm |
| Combined thickness of magnetic layer and nonmagnetic layer | | 1.10 μm | 1.10 μm | 1.10 μm | 1.10 μm | 1.10 μm | 0.90 μm |
| Nonmagnetic support thickness | | 4.30 μm | 4.30 μm | 4.30 μm | 3.80 μm | 3.40 μm | 4.30 μm |
| Backcoat layer thickness | | 0.60 μm | 0.40 μm | 0.30 μm | 0.60 μm | 0.60 μm | 0.60 μm |
| Total thickness of magnetic tape | | 6.00 μm | 5.80 μm | 5.70 μm | 5.50 μm | 5.10 μm | 5.50 μm |
| Cooling zone residence time | | 0 s | 0 s | 0 s | 0 s | 0 s | 0 s |
| Burnishing treatment before curing step | | Not implemented | Not implemented | Not implemented | Not implemented | Not implemented | Not implemented |
| Base portion friction | | 0.45 | 0.45 | 0.45 | 0.45 | 0.45 | 0.45 |
| Logarithmic decrement on the surface on the magnetic layer side of magnetic tape | | 0.057 | 0.057 | 0.057 | 0.057 | 0.057 | 0.057 |
| Number of partial output drops | | 1 time | 1 time | 1 time | 1 time | 1 time | 1 time |

| | | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|---|---|
| Ferromagnetic powder (1) | Kind | BF | BF | BF | BF | MP | BF | BF | BF | BF |
| | Average particle size | 25 nm | 25 nm | 25 nm | 25 nm | 32 nm | 25 nm | 25 nm | 25 nm | 25 nm |
| | Formula ratio | 100% | 100% | 100% | 99.0% | 99.0% | 100% | 100% | 100% | 100% |
| Ferromagnetic powder (2) | Kind | | | | BF | MP | | | | |
| | Average particle size | | | | 55 nm | 60 nm | | | | |
| | Formula ratio | | | | 1.0% | 1.0% | | | | |
| Magnetic layer thickness | | 0.10 μm | 0.10 μm | 0.10 μm | 0.10 μm | 0.10 μm | 0.10 μm | 0.10 μm | 0.05 μm | 0.10 μm |
| Nonmagnetic layer thickness | | 0.70 μm | 0.50 μm | 0.10 μm | 0.50 μm | 0.50 μm | 0.50 μm | 0.5 μm | 0.70 μm | 0.70 μm |
| Combined thickness of magnetic layer and nonmagnetic layer | | 0.80 μm | 0.6 μm | 0.20 μm | 0.60 μm | 0.60 μm | 0.60 μm | 0.6 μm | 0.75 μm | 0.80 μm |
| Nonmagnetic support thickness | | 4.30 μm | 4.30 μm | 4.30 μm | 4.30 μm | 4.30 μm | 4.30 μm | 4.30 μm | 4.30 μm | 4.30 μm |
| Backcoat layer thickness | | 0.60 μm | 0.60 μm | 0.60 μm | 0.60 μm | 0.60 μm | 0.60 μm | 0.60 μm | 0.60 μm | 0.60 μm |
| Total thickness of magnetic tape | | 5.50 μm | 5.50 μm | 5.10 μm | 5.50 μm | 5.50 μm | 5.50 μm | 5.50 μm | 5.50 μm | 5.50 μm |
| Cooling zone residence time | | 0 s | 0 s | 0 s | 0 s | 0 s | 1 s | 60 s | 0 s | 0 s |
| Burnishing treatment before curing step | | Not implemented | Not implemented | Not implemented | Not implemented | Not implemented | Implemented | Implemented | Not implemented | Not implemented (Burnishing treatment was implemented after curing step.) |

TABLE 1-continued

| Base portion friction | 0.45 | 0.45 | 0.45 | 0.28 | 0.26 | 0.45 | 0.45 | 0.45 | 0.45 |
|---|---|---|---|---|---|---|---|---|---|
| Logarithmic decrement on the surface on the magnetic layer side of magnetic tape | 0.057 | 0.057 | 0.057 | 0.057 | 0.057 | 0.046 | 0.035 | 0.057 | 0.057 |
| Number of partial output drops | 5 times | 7 times | 8 times | 5 times | 6 times | 4 times | 4 times | 5 times | 5 times |

Based on the results in Table 1, the following points can be determined.

(1) In the magnetic tapes of Comparative Examples 1 to 6 in which the combined thickness of the magnetic layer and nonmagnetic layer exceeded 0.80 μm, even when the logarithmic decrement of the surface on the magnetic layer side exceeded 0.050 and the base portion friction exceeded 0.35, the number of partial output drops was less than or equal to 3. That is, in magnetic tapes in which the combined thickness of the magnetic layer and the nonmagnetic layer exceeded 0.80 μm, no correlation was found between the number of partial output drops, the logarithmic decrement, and the base portion friction.

(2) By contrast, a comparison of Examples 1 to 12 and Comparative Examples 7 to 15 reveals that in magnetic tapes in which the combined thickness of the magnetic layer and nonmagnetic layer was less than or equal to 0.80 μm, having a logarithmic decrement on the magnetic layer side of less than or equal to 0.050 and a base portion friction of less than or equal to 0.35 was found to inhibit the occurrence of partial output drops.

An aspect of the present invention is useful in the technical field of magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a nonmagnetic layer comprising nonmagnetic powder and binder on a nonmagnetic support, and comprises a magnetic layer comprising ferromagnetic powder and binder on the nonmagnetic layer, wherein:
the combined thickness of the magnetic layer and the nonmagnetic layer is less than or equal to 0.80 μm;
the logarithmic decrement as determined by a pendulum viscoelasticity test on a surface on the magnetic layer side of the magnetic tape is greater than or equal to 0.010 but less than or equal to 0.050;
the coefficient of friction as measured on a base portion of the surface on the magnetic layer side is less than or equal to 0.35; and
the logarithmic decrement is determined by the following method:
securing a measurement sample of the magnetic tape with the measurement surface, which is the surface on the magnetic layer side, facing upward on a substrate in a pendulum viscoelasticity tester;
disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
raising the surface temperature of the substrate on which the measurement sample has been positioned at a rate of less than or equal to 5° C./min up to 80° C.;
inducing initial oscillation of the pendulum;
monitoring the displacement of the pendulum while it is oscillating to obtain a displacement-time curve for a measurement interval of greater than or equal to 10 minutes; and
obtaining the logarithmic decrement Δ from the following equation:

$$\Delta = \frac{\ln\left(\frac{A_1}{A_2}\right) + \ln\left(\frac{A_2}{A_3}\right) + \Lambda \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation); and the coefficient of friction on the base portion is determined using a spherical indentor at a load of 100 micro-Newton and a speed of 1 micron/s on three random portions of the base portion, calculating the coefficient of friction μ from the formula μ=F/N, where F is the frictional force in Newtons and N is the normal force in Newtons, and adopting the arithmetic average of the three measured values obtained as the coefficient of friction measured on the base portion.

2. The magnetic tape according to claim 1,
wherein the ferromagnetic powder is selected from the group consisting of ferromagnetic hexagonal ferrite powder and ferromagnetic metal powder.

3. The magnetic tape according to claim 1,
wherein the magnetic layer further comprises nonmagnetic powder.

4. The magnetic tape according to claim 3,
wherein the nonmagnetic powder that is contained in the magnetic layer comprises two or more kinds of nonmagnetic powder with differing Mohs hardness.

5. The magnetic tape according to claim 3,
wherein the nonmagnetic powder contained in the magnetic layer comprises inorganic powder with Mohs hardness of higher than 8.

6. The magnetic tape according to claim 3,
wherein the nonmagnetic powder contained in the magnetic layer comprises nonmagnetic colloidal particles.

7. A method of manufacturing a magnetic tape,
wherein the magnetic tape is a magnetic tape which comprises a nonmagnetic layer comprising nonmagnetic powder and binder on a nonmagnetic support, and comprises a magnetic layer comprising ferromagnetic powder and binder on the nonmagnetic layer, wherein:
the combined thickness of the magnetic layer and the nonmagnetic layer is less than or equal to 0.80 μm;
the logarithmic decrement as determined by a pendulum viscoelasticity test on a surface on the magnetic layer side of the magnetic tape according to the method recited in claim 1 is greater than or equal to 0.010 but less than or equal to 0.050;
the coefficient of friction as measured on a base portion of the surface on the magnetic layer side according to the method recited in claim 1 is less than or equal to 0.35, and
the method of manufacturing the magnetic tape comprises:
forming of a nonmagnetic layer and forming of a magnetic layer, wherein the forming of a magnetic layer comprises:
coating a magnetic layer-forming composition comprising ferromagnetic powder, binder, a curing agent, and solvent on a nonmagnetic layer to form a coating layer,
heating and drying the coating layer by a heat treatment, and
curing the coating layer by subjecting the coating layer to a curing treatment;
with cooling the coating layer after the coating but before the heating and drying, and
burnishing the surface of the coating layer after the heating and drying but before the curing.

8. The method of manufacturing a magnetic tape according to claim 7,
wherein the cooling is conducted by placing the coating layer in a cooling environment of −10° C. to 0° C.

9. The method of manufacturing a magnetic tape according to claim 7,
wherein the solvent that is contained in the magnetic layer-forming composition comprises ketone solvent.

10. The method of manufacturing a magnetic tape according to claim 7,
wherein the curing agent is a thermosetting compound and the curing is conducted by a heat treatment.

11. The method of manufacturing a magnetic tape according to claim 10,
wherein the thermosetting compound is polyisocyanate.

12. The method of manufacturing a magnetic tape according to claim 7,
wherein a surface-smoothing is conducted between the burnishing and the curing.

13. The method of manufacturing a magnetic tape according to claim 7,
wherein the ferromagnetic powder is selected from the group consisting of ferromagnetic hexagonal ferrite powder and ferromagnetic metal powder.

14. The method of manufacturing a magnetic tape according to claim 7,
wherein the magnetic layer further comprises nonmagnetic powder.

15. The method of manufacturing a magnetic tape according to claim 14,
wherein the nonmagnetic powder that is contained in the magnetic layer comprises two or more kinds of nonmagnetic powder with differing Mohs hardness.

16. The method of manufacturing a magnetic tape according to claim 14,
wherein the nonmagnetic powder contained in the magnetic layer comprises inorganic powder with Mohs hardness of higher than 8.

17. The method of manufacturing a magnetic tape according to claim 14,
wherein the nonmagnetic powder contained in the magnetic layer comprises nonmagnetic colloidal particles.

* * * * *